J. WILCOX.
METHOD OF MAKING TOILET ARTICLES FOR PERSONAL WEAR.
APPLICATION FILED APR. 25, 1908.

951,497.

Patented Mar. 8, 1910.

Witnesses:
H. M. Rugg
E. M. Allen

Inventor
J. Wilcox
By Attorneys
Southgate & Southgate.

UNITED STATES PATENT OFFICE.

JOSEPH WILCOX, OF ATHOL, MASSACHUSETTS.

METHOD OF MAKING TOILET ARTICLES FOR PERSONAL WEAR.

951,497.    Specification of Letters Patent.    Patented Mar. 8, 1910.

Application filed April 25, 1908. Serial No. 429,143.

*To all whom it may concern:*

Be it known that I, JOSEPH WILCOX, a citizen of the United States, residing at Athol, in the county of Worcester and State of Massachusetts, have invented a new and useful Method of Making Toilet Articles for Personal Wear, of which the following is a specification.

This invention relates to a method of making ornamental backs or other parts of combs and similar articles which are formed from sheets of celluloid, viscoloid, pyroxylin, pyralin, shell, horn, rubber, or any other material from which such articles may be produced.

The principal objects of the invention are to provide a simple and practicable method of producing that class of stamped or molded articles which are perforated and in which the surfaces of the skeleton between the perforations are rounded over so as to produce a pleasing and ornamental effect; and in general to improve and simplify the method of producing this particular type of comb backs and the like.

Reference is to be had to the accompanying drawing which shows a preferred way of carrying out the invention, and in which—

Figures 1, 2:
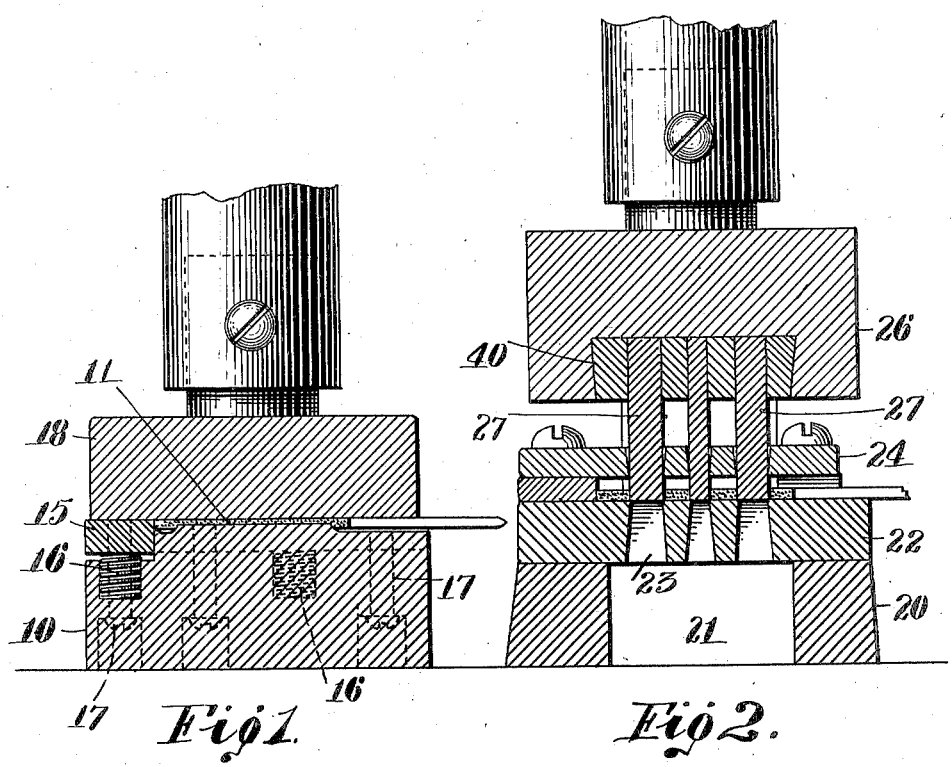
Figure 3:
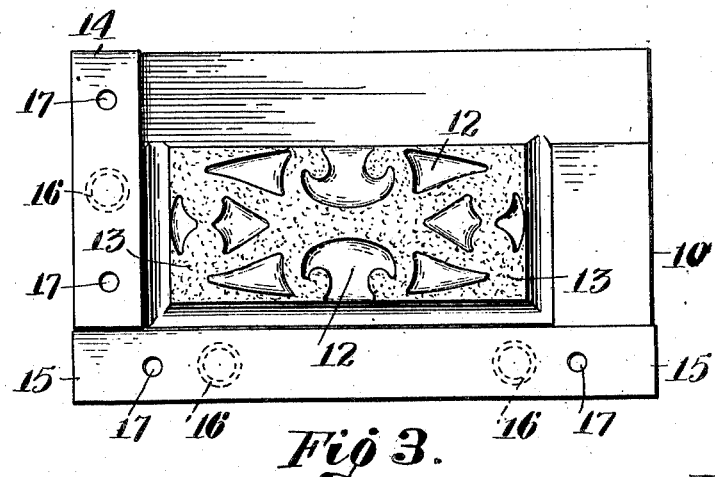

Figure 1 is a transverse sectional view of an embossing die and coöperating parts in position for carrying out one step of the process; Fig. 2 is a similar view showing the next step in the process, and illustrating the punching die and coöperating parts; and Fig. 3 is a plan of the embossing die.

The molding and manipulation of celluloid, pyroxylin, and similar plastic materials, to change the form after the same has once been produced or molded in the form of sheets, is attended with many difficulties. In the first place it is well known that the celluloid, as well as kindred substances, tends to return to its original condition; that is, to the first sheet form in which it was originally produced from the shapeless mass of plastic material. Even when a flat object is desired, it is necessary to provide for keeping it flat as the heating of the blank sometimes warps it. Several ways have been devised for attempting to overcome this natural tendency of the celluloid, but there are some forms of articles which have been produced in a permanent condition only with great difficulty and somewhat expensive manipulations. One of these forms is that which is perforated or punched to produce a figure of what may be called a skeleton form and in which it is desired to provide rounded over edges of the skeleton frame-work between the perforations.

One of the objects of this invention is to provide a simple and convenient method of accomplishing this result.

According to this invention the results are obtained entirely by means of dies or stamps which are so formed and so manipulated that the comb back or the like, although formed from an ordinary flat sheet of plastic material, is left at the end of the process in a permanent form so that it will retain its shape unless it is heated so as to destroy the condition of the stresses set up in the material.

Heretofore the perforations in such articles generally have been made partly by hand; that is the perforations in some cases have been made by handwork; by cutting out each perforation independently either by an individual die or other cutting means, or by grinding off hollow projections formed on the back. This obviously is a slow process which makes it impossible for these articles to be produced in commercial quantities at satisfactory prices.

By this invention the entire article is produced by means of dies or stamps, and the heated blank is treated in such a way that the formation produced by one set of dies or stamps will not be destroyed by any reheating process or by the action of any other dies or stamps which may be necessary.

Broadly stated the method is carried out as follows:—The blank of sheet material is heated to the proper degree and is then placed upon an embossing die which has an intaglio surface provided with rounded edges, so that the projections to be produced on the blank thereby will have rounded or curved surfaces, and so that they need not be further treated after being removed from this embossing die. The embossing die is provided with gages so as to properly locate the blank thereon, and a flat die is brought down upon the blank from above to press it into the embossing die. The upper die is left in contact with the blank a short period of time to allow the impression to be made, and the material to set. The upper die is then raised and the blank removed. Then it is preferably immediately placed on a perforated die-plate having gages arranged similarly to the gages connected with the embossing die and having perforations of a location and shape corresponding to the projections on the embossing die, and therefore the depressions produced thereby on the blank. On account of this construction the blank is so located by the gages that it registers with the perforated die. The perforated die is preferably covered at a distance above it by a perforated guide plate of a similar character. A perforating die or punch is then brought down through the two perforated plates so as to punch out the parts of the blank left depressed thereon by the embossing die so as to leave the projecting parts of the blank in bold relief. On account of the previous operation of the embossing die, the punches have comparatively little work to do, having only to punch through a thin web. Thus little power is required, but the chief advantage is that, little force being used, a high degree of heat is not required, and there is little tendency to distort the design previously made. Also the actual cutting operation is near the rear where the fin, if one is produced, is out of sight. In this way the article is produced in its flat form by two operations only, each of these being nearly instantaneous.

If desired the blank need not be immediately placed in the punching dies after it comes out of the embossing dies, but there may be an interval between the two operations. In this case it is much preferred not to allow this interval to be long enough to permit the blank to entirely cool off. If the blank retains a large amount of its initial heat which it had when it was embossed, it can be slightly re-heated between operations without destroying the embossed surface or injuring it in any way, and the process may be carried out in that way, but I prefer to make the process continuous so that no re-heating is required.

Referring to the drawing it will be seen that the set of embossing dies comprises a base 10 on which is mounted the die plate 11. This die is shown as of flat form having an upper intaglio embossing surface which is provided with rounded depressions 12 so as to form rounded projections on the blank. Between the depressions on the die are projections 13 which when the die is used with the punching dies to be described, may be of any desired character, but when used alone to form ornamental unperforated comb-backs, these projections are provided with a stippled surface, the purpose of which is to produce an ornamental comb or the like of translucent material having an embossed clear figure and a background having numerous small projections constituting a surface contrasting with the embossed portion of the article.

Located adjacent to the two edges of the embossing die are gages 14 and 15. These gages are supported by springs 16 and guided by pins 17 so that when the head 18 comes down upon the die plate the gages will yield and permit the proper compression of the material. It will be understood from what has been said that the blank is heated before it is placed in this die, and that the die is preferably operated upon the table of an ordinary machine, such as is well known in this art.

When the blank has been removed from this die after having been properly pressed and embossed, it is placed in a second set of dies which consists of a base 20 having a central opening 21 therein, and provided with a perforated die-plate 22 having perforations 23 corresponding in location and position with the surfaces 13 on the embossing die. Spaced a little above this plate is a second perforated plate 24 having similar perforations 25, and above it is a plunger head 26 having die punches 27 corresponding with the perforations. The space between the plates 22 and 24 is for the reception of the plastic material.

The die punches or cutting dies 27 are preferably inserted in the head 26 in an improved manner. For this purpose this head is provided with a depression 30 in the face thereof which conveniently may be of any desired shape, but is shown as dove-tailed and extending in from the outer surface for an appreciable distance. When the die is to be made, the punches are individually set on the bottom of this depression and spaced preferably by means of a templet or the like. In order to fix them permanently and securely in position, Babbitt or other metal is cast around them in the depression in the die. This holds them properly in position. These dies are made of tempered steel and on account of the fact that the blanks are heated when the die cutting is to be performed, they may be made with flat lower surfaces, the cutting edges coming into engagement with the cutting edges of the tops of the perforations 23 in such a way as properly to cut the blank.

While I have illustrated and described a preferred form of apparatus I am aware that many modifications may be made therein by any person skilled in the art and that the method may be varied in detail without departing from the scope of the invention as expressed in the claims. Therefore I do not wish to be limited to the details shown and described but What I do claim is:—

1. A method of making comb-backs and the like, which consists in heating a flat celluloid blank in sheet form, compressing it between dies to emboss one side thereof and make depressions in that side and extending part way through the blank, leaving the other side flat, removing it from the dies, and thereafter punching vertically down through and cutting out the parts of the blank which were depressed by the embossing dies.

2. A method of making comb-backs and the like, which consists in heating a flat celluloid blank in sheet form, compressing it between dies, and making depressions in one face extending only part way through the blank, removing it from the dies, and at the same heat thereafter punching vertically down through and cutting out the parts of the blank which were depressed.

3. A method of making comb-backs and the like, which consists in heating a celluloid blank in sheet form, compressing it between a pair of dies, one of which has a flat surface and the other an intaglio surface with rounded depressions so as to emboss one side thereof only, and thereafter, while the blank is still heated, perforating the same by dies descending from above to cut out the parts which are left depressed by said intaglio die.

4. A method of making comb-backs and the like, which consists in heating a celluloid blank in sheet form, compressing it between a pair of dies, one of which has an intaglio surface with rounded depressions so as to emboss one side thereof, removing it from the dies, and thereafter placing the blank while warm on a die having perforations corresponding in form and location with the projections on said intaglio die, so locating the blank that the parts depressed by said intaglio die will register with said perforations and bringing a perforating die on the blank, said perforating die having die punches fitting the perforations in the perforated die.

In testimony whereof I have hereunto set my hand, in the presence of two subscribing witnesses.

JOSEPH WILCOX.

Witnesses:
OTHELLO A. FAY,
KATHERINE G. KEEFE.